(12) United States Patent
He et al.

(10) Patent No.: US 7,047,125 B1
(45) Date of Patent: May 16, 2006

(54) INTERNAL COMBUSTION ENGINE PERFORMANCE CALIBRATION SYSTEMS

(75) Inventors: Bin He, Peoria, IL (US); Jeffrey D. Baskett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/066,244

(22) Filed: Feb. 25, 2005

(51) Int. Cl.
*G06G 7/70* (2006.01)

(52) U.S. Cl. .................. 701/110; 701/101; 701/111; 73/117.3

(58) Field of Classification Search ........... 701/115, 701/101, 110, 111, 114; 73/116, 117.3; 123/435, 123/436
See application file for complete search history.

(56) References Cited

U.S. PATENT DOCUMENTS

| | | | |
|---|---|---|---|
| 5,771,482 A * | 6/1998 | Rizzoni | 701/101 |
| 5,771,483 A | 6/1998 | Moine et al. | |
| 5,774,823 A | 6/1998 | James et al. | |
| 5,878,366 A | 3/1999 | Schricker et al. | |
| 5,951,618 A | 9/1999 | Fukuchi et al. | |
| 6,029,109 A | 2/2000 | Rossignol et al. | |
| 6,039,028 A * | 3/2000 | Stuntz et al. | 123/436 |
| 6,082,187 A | 7/2000 | Schricker et al. | |
| 6,085,143 A * | 7/2000 | Przymusinski et al. | 701/110 |
| 6,112,149 A | 8/2000 | Varady et al. | |
| 6,131,444 A | 10/2000 | Wu et al. | |
| 6,199,007 B1 | 3/2001 | Zavarehi et al. | |
| 6,199,426 B1 | 3/2001 | Shibagaki | |
| 6,205,973 B1 | 3/2001 | Bauer et al. | |
| 6,223,120 B1 | 4/2001 | Williams | |
| 6,234,010 B1 | 5/2001 | Zavarehi et al. | |
| 6,332,352 B1 | 12/2001 | Sano | |
| 6,354,149 B1 | 3/2002 | Serra et al. | |

* cited by examiner

*Primary Examiner*—Hieu T. Vo
(74) *Attorney, Agent, or Firm*—Finnegan, Henderson, Farabow, Garrett & Dunner LLP

(57) ABSTRACT

A system is provided for estimating an operational parameter of a first engine, the first engine including a rotatable crankshaft. The system includes a model for estimating the operational parameter of the first engine as a function of instantaneous crankshaft speed at a plurality of angular positions of the crankshaft of the first engine. The model is developed, at least partially, based upon operational data from a second engine having a rotatable crankshaft. A sensor is operable to determine values representative of the instantaneous crankshaft speed of the first engine, at a plurality of angular positions of the crankshaft of the first engine. A modifier is operable to modify at least some of the representative values to, at least partially, calibrate out differences between the first and second engines that may cause variations in instantaneous crankshaft speed. The modified values are input to the model.

24 Claims, 3 Drawing Sheets

INTERNAL COMBUSTION ENGINE PERFORMANCE CALIBRATION SYSTEMS

TECHNICAL FIELD

The present disclosure relates generally to controls for internal combustion engines and, more specifically, to methods and apparatus for compensating for variations in internal combustion engines.

BACKGROUND

Internal combustion engines may experience power loss due to, for example, clogged fuel injectors or misfiring cylinders. These power loss conditions may cause excess exhaust emissions. In order to comply with government regulation of exhaust emissions, manufacturers of internal combustion engines may provide systems for monitoring engine performance. Knowledge of crankshaft torque may provide an indication of both an actual power level and the presence of a power loss condition of the engine. However, direct measurement of crankshaft torque requires an expensive measuring device, such as a dynamometer. Further, the accurate estimation of crankshaft torque requires complex calculations and input from a variety of engine sensors.

Prior art methods for simplifying torque calculations have been developed. One such method is described in U.S. Pat. No. 6,234,010 to Zavarehi et al. In this method, the crankshaft speed and torque output of a test engine are measured and a pattern matching algorithm, such as a radial basis neural network or other neural network, is used to create a model that correlates small fluctuations in crankshaft speed with variations in crankshaft kinetic energy caused by the firing and compression events of each cylinder. The model may then be used to estimate crankshaft torque based upon crankshaft speed fluctuations measured during operation.

However, small variations between engines can introduce large variations in instantaneous crankshaft speed. For example, slight differences in crankshaft tolerances or materials may affect the inertia of the crankshaft, and thus affect instantaneous crankshaft speed. Consequently, the Zavarehi et al. model may produce an unacceptably high margin of error when applied to engines other than the test engine that it was developed on. Even where the model is applied to the test engine, the margin of error may become unacceptable as the test engine's crankshaft wears over time.

Further, the process of constructing the neural network model is time consuming and expensive. Consequently, it is impractical to construct such a model for each engine produced, or to reconstruct the model for the test engine when it becomes inaccurate.

The presently disclosed systems and methods for calibrating models of internal combustion engine performance are directed to solving one or more of these shortcomings of the prior art systems and methods.

SUMMARY OF THE DISCLOSURE

In one aspect, the present disclosure is directed to a method for estimating an operational parameter of a first engine using a model developed, at least partially, based upon operational data from a second engine, the first and second engines each including a rotatable crankshaft. A model for estimating the operational parameter of the first engine as a function of instantaneous crankshaft speed at a plurality of angular positions of the crankshaft of the first engine is received. Values representative of the instantaneous crankshaft speed of the first engine are determined at a plurality of angular positions of the crankshaft of the first engine. At least some of the representative values are modified to, at least partially, calibrate out differences between the first and second engines that may cause variations in instantaneous crankshaft speed. The modified values are input to the model.

In another aspect, the present disclosure is directed to a system for estimating an operational parameter of a first engine, the first engine including a rotatable crankshaft. The system includes a model for estimating the operational parameter of the first engine as a function of instantaneous crankshaft speed at a plurality of angular positions of the crankshaft of the first engine. The model is developed, at least partially, based upon operational data from a second engine having a rotatable crankshaft. A sensor is operable to determine values representative of the instantaneous crankshaft speed of the first engine, at a plurality of angular positions of the crankshaft of the first engine. A modifier is operable to modify at least some of the representative values to, at least partially, calibrate out differences between the first and second engines that may cause variations in instantaneous crankshaft speed. The modified values are input to the model.

In another aspect, the present disclosure is directed to an engine, the engine being a first engine. The engine includes a rotatable crankshaft. The engine also includes a control system operable to estimate an operational parameter of the engine. The control system includes a model for estimating the operational parameter of the first engine as a function of instantaneous crankshaft speed at a plurality of angular positions of the crankshaft of the first engine. The model is developed, at least partially, based upon operational data from a second engine having a rotatable crankshaft. A sensor is operable to determine values representative of the instantaneous crankshaft speed of the first engine, at a plurality of angular positions of the crankshaft of the first engine. A modifier is operable to modify at least some of the representative values to, at least partially, calibrate out differences between the first and second engines that may cause variations in instantaneous crankshaft speed. The modified values are input to the model.

It is to be understood that both the foregoing general description and the following detailed description are exemplary and explanatory only, and are not restrictive of the disclosure as claimed.

DETAILED DESCRIPTION

Figure 1:
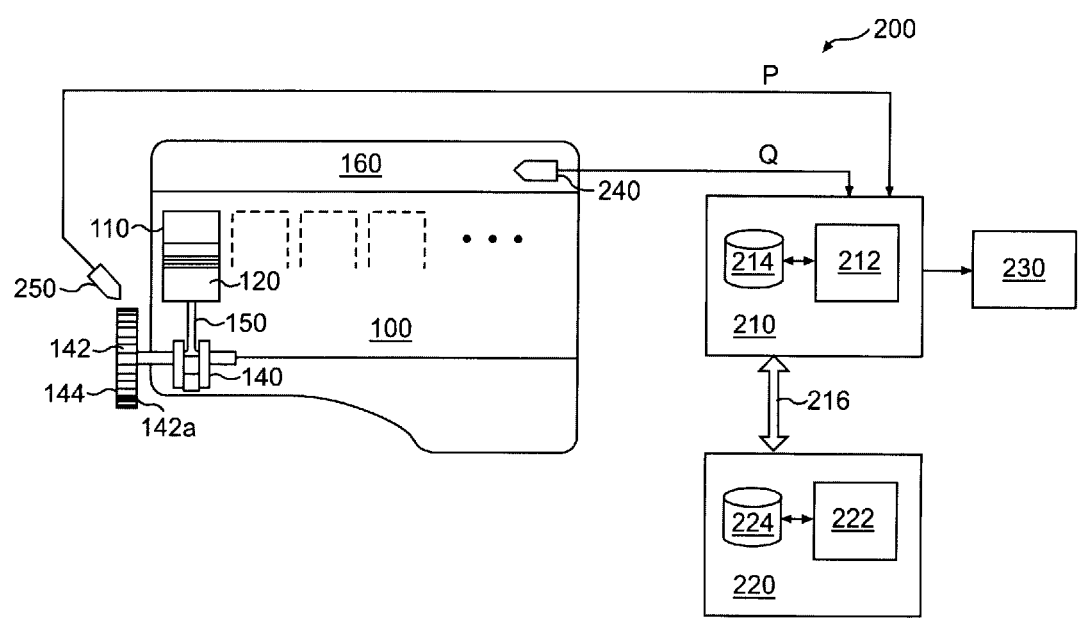
FIG. 1 schematically illustrates an internal combustion engine and an electronic control system in accordance with an exemplary embodiment of the present disclosure.

FIG. 1 schematically illustrates an internal combustion engine 100 having an electronic control system 200 in accordance with an exemplary embodiment of the present disclosure. Engine 100 and control system 200 may be used in any suitable application. For example, engine 100 may be used to power a work machine or electrical generator.

However, other appropriate applications of engine 100 will be apparent to those of skill in the art.

Engine 100 may be any size and type of internal combustion engine. For example, engine 100 may be a compression-ignited or spark-ignited engine having one or more cylinders 110. As shown in FIG. 1, each cylinder 110 may have a piston 120 reciprocally movable therein. Each piston 120 may be operably connected to a crankshaft 140 by a connecting rod 150. A governor 160 may deliver fuel to each cylinder 110 where it may be ignited to drive piston 120 and thus rotate crankshaft 140.

Electronic control system 200 may include an electronic control module (ECM) 210 for monitoring and controlling the operation of engine 100. As shown in FIG. 1, ECM 210 may include a processor 212 and a memory 214 in communication with processor 212. Processor 212 may be implemented using, e.g., a microprocessor or other suitable processor. Memory 214 may be implemented using any suitable computer-readable media, and may include RAM and/or ROM.

Memory 214 may store software, such as algorithms and/or data, for configuring processor 212 to perform one or more functions of ECM 210. Alternatively, ECM 210 may include discrete electronic circuits configured to perform such functions. In an exemplary embodiment of the present disclosure, ECM 210 may be operable to perform a torque estimation function. For example, ECM 210 may be operable to estimate the average crankshaft torque produced by engine 100. In another embodiment, ECM 210 may be operable to perform a power loss detection function. For example, ECM 210 may be operable to detect a power loss condition in one or more cylinders 110 of engine 100. In another embodiment, ECM 210 may be operable to perform a percent cylinder-power estimation function. For example, ECM 210 may be operable to estimate the percentage of normal power achieved by one or more cylinders 110 of engine 100.

ECM 210 may also include an input/output interface 216 for selectively communicating with a service tool 220, such as a diagnostic/service computer. Interface 216 may be implemented using any appropriate technology. For example, interface 216 may be implemented using a wired or wireless data interface.

Service tool 220 may include a processor 222 and a memory 224 in communication with processor 222. Memory 224 may store software, such as algorithms and/or data, for configuring processor 222 to perform one or more functions of service tool 220. Alternatively, service tool 220 may include discrete electronic circuits configured to perform such functions. Service tool 220 may also include an output device, such as a display screen and/or printer (not shown), for presenting output to an operator, and an input device, such as a keyboard and/or pointing device (not shown), for receiving commands and/or data from the operator.

Service tool 220 may be used to monitor and/or control the operation of engine 100 and/or electronic control system 200. For example, an operator (e.g., a service technician) may use service tool 220 to perform diagnostic tests on engine 100 and/or electronic control system 200. Service tool 220 may also be used to program processor 212 of ECM 210. For example, an operator may use service tool 220 to download new software into memory 214 of ECM 210 via interface 216. In an exemplary embodiment of the present disclosure, service tool 220 may be used to calibrate functions performed by ECM 210, as discussed below.

Electronic control system 200 may also include a display 230 in communication with ECM 210. Display 230 may present information related to the operation of engine 100 and/or electronic control system 200. In an exemplary embodiment, ECM 210 may control display 230 to present data related to engine torque, power loss, and/or percent cylinder-power. Display 230 may be implemented using any suitable type of display. For example, display 230 may be implemented using a graphical and/or character display, such as a liquid crystal display (LCD). Display 230 may be located in a position visible to an operator of engine 100. For example, display 230 may be located in an operator cab (not shown) of a work machine powered by engine 100.

Electronic control system 200 may also include one or more sensors for sensing operational parameters of engine 100. For example, system 200 may include a fuel quantity sensor 240 for sensing a parameter indicative of an amount of fuel requested by governor 160, and a position sensor 250 for sensing a parameter indicative of a rotational position of crankshaft 140.

Fuel quantity sensor 240 may output a fuel quantity signal Q representative of the amount of fuel requested by governor 160. Fuel quantity sensor 240 may be implemented using any suitable sensing technology. For example, the fuel quantity signal Q may be a derived value that correlates to a position of a fuel rack (not shown) of governor 160.

Position sensor 250 may output a position signal P representative of the angular position of crankshaft 140. Position sensor 250 may be implemented using any appropriate sensing technology. For example, position sensor 250 may be implemented using an electronic transducer, such as a magnetic speed pick-up, operable to sense the passage of indicia 142, such as angularly spaced teeth, on a crank gear 144 of crankshaft 140. However, other implementations of position sensor 250 will be apparent to those skilled in the art.

Indicia 142 may correspond to a discrete plurality of angular positions of crankshaft 140. In an exemplary six-cylinder engine, for instance, indicia 142 may be equiangularly spaced to define twenty-four positions of crankshaft 140. However, the number of crankshaft positions defined by indicia 142 may be any convenient number. For example, indicia 142 may be spaced at ten degree intervals so as to instead define thirty-six discrete angular positions of crankshaft 140. Indicia 142 may include an indicator 142a for indicating a zero position of crankshaft 140, such as the position in which a first piston 120 is in a top-dead-center position within cylinder 110. The top-dead-center positions of the remaining pistons 120 (if any) may then be known based on their relation to zero position indicator 142a. As illustrated in FIG. 1, for example, the zero position of first piston 120 may be indicated by a missing tooth on crank gear 144. However, other appropriate implementations of zero position indicator 142a will be apparent to those skilled in the art.

ECM 210 may use the outputs Q and P of sensors 240 and 250 in order to perform one or more functions. In an exemplary embodiment of the present disclosure, ECM 210 may estimate crankshaft torque based upon the values of output signals Q and P. In another embodiment, ECM 210 may detect a power loss condition in one or more cylinders 110 based upon the values of output signals Q and P. In another embodiment, ECM 210 may estimate the percentage of normal power achieved by one or more cylinders 110, based upon the values of output signals Q and P.

Figure 2:
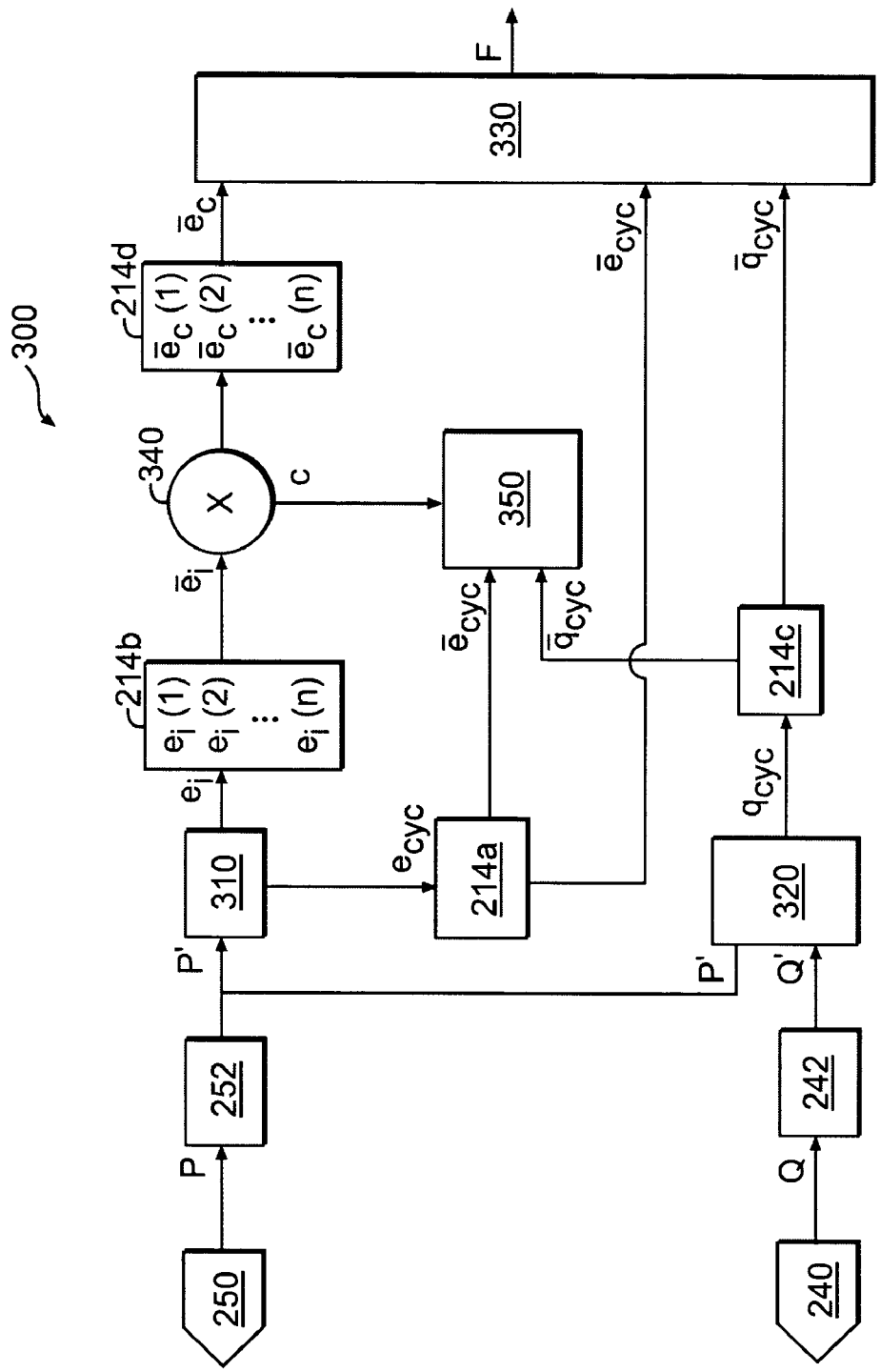
FIG. 2 schematically illustrates an exemplary function of an electronic control module (ECM) in accordance with an exemplary embodiment of the present disclosure.

FIG. 2 schematically illustrates an exemplary function 300 of ECM 210. In one embodiment of the present disclosure, function 300 may be a torque estimation function of ECM 210. In another embodiment, function 300 may be a power loss detection function of ECM 210. In another embodiment, function 300 may be a percent cylinder-power estimation function of ECM 210.

In an exemplary embodiment of the present disclosure, ECM 210 may trigger function 300 to begin periodically. The period between triggers may be a predetermined period of time, e.g., every fifteen milliseconds. Alternatively, the period between triggers may be, for example, a predetermined number of engine cycles, e.g., fifteen full engine cycles (as indicated by position signal P).

As illustrated in FIG. 2, function 300 may include signal conditioners 242 and 252 for conditioning signals Q and P from sensors 240 and 250, respectively, and outputting corresponding conditioned signals Q' and P'. Signal conditioners 242 and 252 may perform, e.g., appropriate scaling and filtering functions on signals Q and P. However, other appropriate conditioning will be apparent to those skilled in the art. Signal conditioners 242 and 252 may be implemented as functions of ECM 210. Alternatively, signal conditioners 242 and 252 may be implemented as functions of sensors 240 and 250, respectively.

The conditioned output P' of position sensor 250 may be provided to a speed calculator 310. Speed calculator 310 may determine a rotational speed of engine 100 over a predetermined sample period (e.g., a predetermined number of engine cycles, such as one full engine cycle) and output a signal $e_{cyc}$ representative of the cycle speed, e.g., in rpm. For example, speed calculator 310 may calculate the cycle speed $e_{cyc}$ based on the period over which crankshaft 140 completes two full revolutions (one full engine cycle), e.g., as indicated by the rotation of zero position indicator 142a past position sensor 250. However, other methods of calculating the cycle speed will be apparent to those skilled in the art.

Speed calculator 310 may also determine the instantaneous angular speeds of crankshaft 140 for a discrete plurality of angular crankshaft positions 1 through n within an engine cycle and output a signal $e_i(n)$ indicative of the instantaneous angular speed $e_i$ at each position n, e.g., in rpm. For example, speed calculator 310 may determine the instantaneous angular speed at some or all of the discrete positions of crankshaft 140 defined by indicia 142. However, the value of n may be less than or greater than the number of indicia 142. In one embodiment, speed calculator 310 may determine the instantaneous angular speed at a particular position n of crankshaft based upon a period between the rotation of the indicia 142 corresponding to positions n and n+1 past position sensor 250. However, other methods of calculating the instantaneous angular speed will be apparent to those skilled in the art.

In an exemplary embodiment, speed calculator 310 may determine an average value of the cycle speed ($\bar{e}_{cyc}$) and/or the instantaneous angular speed ($\bar{e}_i$) over a plurality of sample periods. This averaging may mitigate the effects of noise in conditioned position signal P'. For example, speed calculator 310 may maintain a running average of the cycle speed over a predetermined number of engine cycles (e.g., twenty cycles) in a predetermined location 214a in memory 214. Similarly, speed calculator 310 may maintain a running average of the instantaneous angular speed at each of positions 1 through n over a predetermined number of engine cycles (e.g., twenty cycles) in, e.g., a first table 214b in memory 214.

The conditioned output Q' of fuel quantity sensor 240 and the conditioned output P' of position sensor 250 may be provided to a fuel flow calculator 320. Fuel flow calculator 320 may determine a rate of fuel flow to engine 100 over the sample period and output a fuel flow rate signal $q_{cyc}$ indicative thereof, e.g., in mm³/S. For example, fuel flow calculator 320 may calculate the fuel flow rate based on the amount of fuel requested by governor 160 in the period over which crankshaft 140 completes two full revolutions, e.g., as indicated by conditioned position signal P'. However, other methods of calculating the fuel flow rate will be apparent to those skilled in the art.

The fuel flow rate may be used as an indication of the load on engine 100. However, other parameters representative of engine load may be used.

In an exemplary embodiment, fuel flow calculator 320 may determine an average value of the fuel flow rate ($\bar{q}_{cyc}$) over a plurality of sample periods. This averaging may mitigate the effects of noise in conditioned fuel quantity signal Q'. For example, fuel flow calculator 320 may maintain a running average of the fuel flow rate over a predetermined number of engine cycles (e.g., twenty cycles) in a predetermined location 214c in memory 214.

Function 300 may also include a model 330. Model 330 may be operable to estimate the value of a desired engine parameter based upon inputs $\bar{q}_{cyc}$, $\bar{e}_{cyc}$ and $\bar{e}_i$. In one embodiment of the present disclosure, model 330 may be operable to estimate the average crankshaft torque produced by engine 100. In another embodiment, model 330 may be operable to determine a power loss condition of engine 100. In another embodiment, model 330 may be operable to estimate percent cylinder-power for at least one cylinder 110 of engine 100. For example, model 330 may be operable to estimate engine torque, detect power loss, and/or estimate percent cylinder-power based upon the magnitude of crankshaft speed fluctuations, which may be determined from inputs $\bar{q}_{cyc}$, $\bar{e}_{cyc}$ and $\bar{e}_i$.

Model 330 may be at least partially based upon base data generated during laboratory testing of a test engine (not shown) similar or identical to engine 100 (capital lettering is used herein to refer to parameters of the base data generated during development of model 330, so as to distinguish the base data from operational data that is input during use of or calibration of model 330). During the development of model 330, the crankshaft of the test engine may be coupled to a dynamometer, and the test engine run at various combinations of average cycle speed $\bar{E}_{cyc}$ and average fuel flow rate $\bar{Q}_{cyc}$ within an operating range of the test engine. The average instantaneous angular speed $\bar{E}_i$ of the crankshaft of the test engine may be measured for a plurality of discrete angular positions 1 through N of crankshaft 140, e.g., using methods similar to those described above. The average instantaneous angular speeds $\bar{E}_i$ of the crankshaft of the test engine may be recorded as a function of the angular position N of the crankshaft of the test engine, the average cycle speed $\bar{E}_{cyc}$ and the average fuel flow rate $\bar{Q}_{cyc}$. For example, the base data may be recorded in a map that records the average instantaneous crankshaft speed $\bar{E}_i$, produced at each of positions 1 through N of the crankshaft of the test engine, over a common operating range of average cycle speeds $\bar{E}_{cyc}$ and average fuel flow rates $\bar{Q}_{cyc}$.

Model 330 may correlate the base data generated during laboratory testing with another engine parameter. For example, model 330 may correlate the base data with engine torque, power loss condition, and/or percent cylinder-power. Methods for developing model 330 will be apparent to those skilled in the art. For example, model 330 may be developed using a pattern matching algorithm, such as a radial basis neural network or other neural network.

Returning to FIG. 2, the average fuel flow rate $\bar{q}_{cyc}$ (from memory location 214c) and average cycle speed $\bar{e}_{cyc}$ (from memory location 214b) may be provided directly to model 330. In an exemplary embodiment of the present disclosure, the average instantaneous angular speeds $\bar{e}_i(1), \ldots \bar{e}_i(n)$ (from first table 214b) may be modified prior to being input to model 330.

For example, the average instantaneous speeds $\bar{e}_i$ may be calibrated to account for variations between engine 100 and the test engine on which model 330 was developed, so that model 330 determines the desired parameter for engine 100 with an acceptable margin of error. Where engine 100 is not the test engine on which model 330 was developed, for instance, the average instantaneous speeds $\bar{e}_i$ may be calibrated to account for variations due to differences in machining and/or materials tolerances between engine 100 and the test engine. In this manner, model 330 may be used with engines similar to the test engine, e.g., with engines of the same model as the test engine, or with engines manufactured on the same production line as the test engine. Where engine 100 is the same engine as the test engine (i.e., where model 330 was developed based upon base data generated during laboratory testing of engine 100 at an earlier time), the average instantaneous speeds $\bar{e}_i$ may be calibrated to account for variations due to wear on engine 100 subsequent to construction of model 330.

As shown in FIG. 2, for example, function 300 may include a modifying function 340. Modifying function 340 may multiply each of the average instantaneous angular speeds $\bar{e}_i(1), \ldots \bar{e}_i(n)$ by a correction factor c specified for the same position, average cycle speed, and average fuel flow rate. Modifying function 340 may then output a corrected average instantaneous angular speed $\bar{e}_c$, where $\bar{e}_c(n, \bar{e}_{cyc}, \bar{q}_{cyc}) = \bar{e}_i(n) \cdot c(n, \bar{e}_{cyc}, \bar{q}_{cyc})$.

The value of correction factor c may vary based on the angular position n, the average cycle speed $\bar{e}_{cyc}$ and/or the average fuel flow rate $\bar{q}_{cyc}$. The correction factor c for a particular angular position, average cycle speed, and average fuel flow rate may be obtained from a correction factor map 350. The construction of map 350 is discussed below in connection with FIG. 3. Map 350 may receive an indication of the crankshaft position n corresponding to the average instantaneous angular speed $\bar{e}_i(n)$ to be corrected, an indication of the average cycle speed $\bar{e}_{cyc}$ (from memory location 214a) and an indication of the average fuel flow rate $\bar{q}_{cyc}$ (from memory location 214c) and output the correction factor $c(n, \bar{e}_{cyc}, \bar{q}_{cyc})$ for the specified position, average cycle speed and average fuel flow rate. If a correction factor c for the exact average cycle speed and average fuel flow rate is not available, then map 350 may provide the closest available correction factor or, alternatively, derive the correction factor by interpolating between the closest available correction factors.

The corrected average instantaneous angular speed $\bar{e}_c$ for each position n may be stored, e.g., in a second table 214d in memory 214, and provided to model 330. Model 330 may then estimate the value of the desired parameter (e.g., torque, power loss and/or percent cylinder-power), based at least partially on the corrected average instantaneous angular speed $\bar{e}_c$, and output a signal F indicative of the value of the desired parameter.

The output signal F may be received by ECM 210. ECM 210 may then use the value indicated by the output signal F in order to convey information relating to the performance of engine 100 to an operator. For example, ECM 210 may display information relating to the performance of engine 100 on display 230, or store such information in memory 214 for later use or retrieval by an operator. Alternatively, ECM 210 may use the value indicated by the signal F to calculate other engine parameters.

Figure 3:
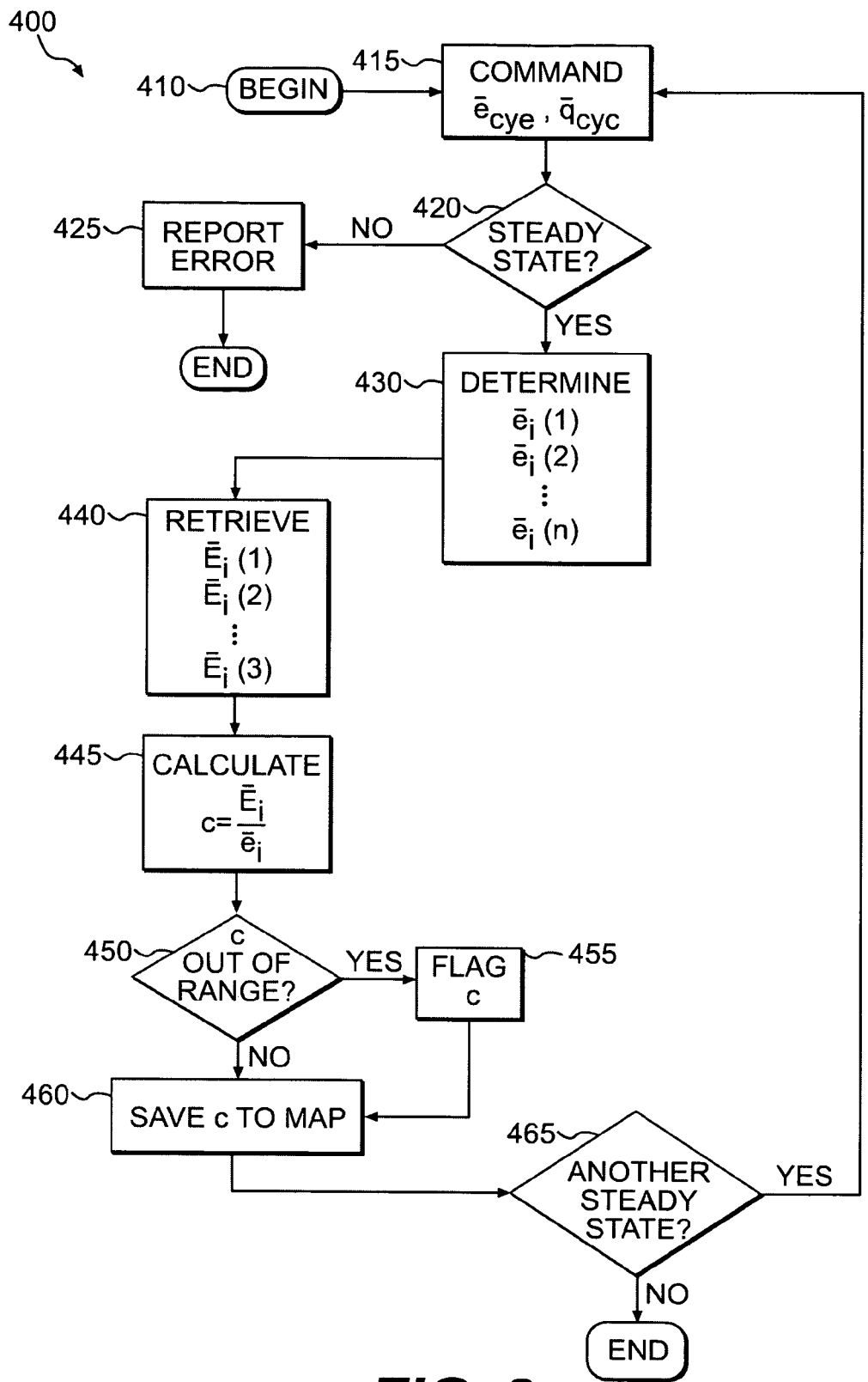
FIG. 3 shows a flow diagram of a method for constructing a correction factor map in accordance with an exemplary embodiment of the present disclosure.

FIG. 3 shows a flow diagram of a method 400 for constructing correction factor map 350. In an exemplary embodiment of the present disclosure, method 400 may be performed by a calibration function of service tool 220 and/or electronic control system 200. Method 400 may be performed by a manufacturer prior to engine 100 being delivered to an operator. Method 400 may be also be performed periodically on engine 100 in order to recalibrate model 330 as engine 100 wears. For example, method 400 may be performed as part of the routine maintenance of engine 100.

As shown in FIG. 3, method 400 may begin at 410. At 415, the calibration function may command engine 100 to achieve a predetermined average cycle speed $\bar{e}_{cyc}$ and average fuel flow rate $\bar{q}_{cyc}$ within a desired calibration range for engine 100. For example, service tool 220 may command ECM 210 to control engine 100 to achieve the desired average cycle speed and average fuel flow rate in a common operating range of engine 100.

At 420, the calibration function may wait for engine 100 to achieve a steady state at the desired average cycle speed $\bar{e}_{cyc}$ and average fuel flow rate $\bar{q}_{cy}$. For example, service tool 220 may monitor the current average cycle speed and average fuel flow rate via sensors 250 and 240, respectively, and determine whether engine 100 has achieved the desired steady state to within an acceptable margin of error. If engine 100 does not achieve the desired steady state within a predetermined period (420: No), then service tool 220 may report an error (at 425), and method 400 may be terminated.

If engine 100 does achieve the desired steady state (420: Yes), then, at 430, the calibration function may determine the instantaneous angular speeds of crankshaft 140 for a discrete plurality of angular crankshaft positions 1 through n of crankshaft 140 within an engine cycle. For example, service tool 220 may access the output $e_i$ of speed calculator 310 and retrieve the instantaneous angular speed at some or all of the discrete positions n of crankshaft 140 defined by indicia 142.

In an exemplary embodiment, the calibration function may determine an average value of the instantaneous angular speeds over a plurality of sample periods. This averaging may mitigate the effects of noise in conditioned position signal P'. For example, service tool 220 may access the average instantaneous angular speeds $\bar{e}_i$ stored in first table 214b in memory 214 of ECM 210. Alternatively, service tool 220 may maintain a running average of the instantaneous angular speed at each position n over a predetermined number of engine cycles (e.g., twenty cycles) in memory 224.

At 440, the calibration function may retrieve a portion of the base data used to develop model 330. For example, the calibration function may retrieve the average instantaneous angular speeds $\bar{E}_i$ for the average cycle speed, average fuel flow rate, and crankshaft positions n that most closely correspond to the current steady state and crankshaft position. If the average instantaneous angular speeds $\bar{E}_i$ for the exact average cycle speed and average fuel flow rate are not available, then calibration function may use the closest available average instantaneous angular speeds $\bar{E}_i$ or, alternatively, derive the average instantaneous angular speeds by interpolating between the closest available average instantaneous angular speeds.

At 445, the calibration function may determine the correction factor c for each crankshaft position, average cycle speed, and average fuel flow rate combination in the desired calibration range. The correction factor c may be determined by dividing the average instantaneous angular speed $\overline{E}_i$ (from the base data), for the same positions (N=1 through n) and closest steady state conditions ($\overline{E}_{cyc} \approx \overline{e}_{cyc}$ and $\overline{Q}_{cyc} \approx \overline{q}_{cyc}$), by the average instantaneous angular speed $\overline{e}_i$ (from the calibration data). That is, $$c(n, \overline{e}_{cyc}, \overline{q}_{cyc}) \approx \overline{E}_i(N, \overline{E}_{cyc}, \overline{Q}_{cyc})/\overline{e}_i(n, \overline{e}_{cyc}, \overline{q}_{cyc}),$$

where N=n, $\overline{E}_{cyc} \approx \overline{e}_{cyc}$ and $\overline{Q}_{cyc} \approx \overline{q}_{cyc}$.

At 450, the calibration function may determine whether the value of the correction factor c lies outside of a desired range. If so (450: Yes), then the calibration function may flag the particular correction factor, at 455. For example, service tool 220 may output a warning that the particular correction factor c is out of the desired range. At 460, the calibration function may save the correction factor c in map 350.

At 465, the calibration function may determine whether data is desired for another steady state of engine 100. If so (465: Yes), then method 400 may return to 415 where service tool 220 may command engine 100 to achieve another predetermined average cycle speed and average fuel flow rate, until data representing the average instantaneous angular speed $\overline{e}_i$ over the desired calibration range of engine 100 has been collected (465: No). Once the calibration function has saved a correction factor for the desired range of positions, average cycle speeds and average fuel flow rates, method 400 may end.

While exemplary method 400 has been described as a series of acts, the order of the acts may vary in other implementations consistent with the present disclosure. In particular, non-dependent acts may be performed in any order, or in parallel. In addition, although method 400 is described as being performed by service tool 220 in combination with electronic control system 200, method 400 may instead be performed solely by electronic control system 200. For example, ECM 210 may be programmed to perform the functions of service tool 220 described in method 400, e.g., during normal operation of engine 100.

INDUSTRIAL APPLICABILITY

The presently disclosed systems and methods for calibrating models of internal combustion engine performance may be applied to any size or type of internal combustion engine. By compensating for variations in engines that may cause variations in instantaneous crankshaft speed, the systems and methods of the present disclosure allows models of engine performance developed on one engine to be applied to another engine with an acceptable margin of error. Consequently, systems and methods of the present disclosure allow engine parameters such as crankshaft torque, power loss, and percent cylinder-power to be determined more accurately and at less expense.

It will be apparent to those skilled in the art that various modifications and variations can be made in the disclosed systems and methods without departing from the scope of the disclosure. Other embodiments of the disclosure will be apparent to those skilled in the art from consideration of the specification and practice of the disclosure disclosed herein. It is intended that the specification and examples be considered as exemplary only, with a true scope of the disclosure being indicated by the following claims.

What is claimed is:

1. An engine, the engine being a first engine, comprising:
   a rotatable crankshaft; and
   a control system operable to estimate an operational parameter of the first engine, the control system including:
   a model for estimating the operational parameter of the first engine as a function of instantaneous crankshaft speed at a plurality of angular positions of the crankshaft of the first engine, the model developed, at least partially, based upon operational data from a second engine having a rotatable crankshaft;
   a sensor operable to determine values representative of the instantaneous crankshaft speed of the first engine, at a plurality of angular positions of the crankshaft of the first engine; and
   a modifier operable to modify at least some of the representative values to, at least partially, calibrate out differences between the first and second engines that may cause variations in instantaneous crankshaft speed, the modified values being input to the model.

2. The engine of claim 1, wherein the operational parameter is at least one of: engine torque, power loss, and percent cylinder-power.

3. The engine of claim 1, wherein the model was developed using at least one of: a pattern matching algorithm and a neural network.

4. The engine of claim 1, wherein the modifier multiplies each representative value to be modified by a correction factor.

5. The engine of claim 4, wherein the correction factor is based upon historical values of instantaneous crankshaft speed of the first engine, and upon historical values of instantaneous crankshaft speed of the second engine.

6. The engine of claim 5, wherein the correction factor is approximately equal to a historical value of instantaneous crankshaft speed at one position of the crankshaft of the second engine divided by a historical value of instantaneous crankshaft speed at a corresponding position of the crankshaft of the first engine measured under similar operating conditions.

7. The engine of claim 6, wherein the similar operating conditions include at least one of: similar average cycle speed and similar engine load.

8. The engine of claim 1, wherein the first and second engines are one of: the same engine, engines of the same type, engines of the same model, and engines manufactured on the same production line.

9. A system for estimating an operational parameter of a first engine, the first engine comprising a rotatable crankshaft, the system comprising:
   a model for estimating the operational parameter of the first engine as a function of instantaneous crankshaft speed at a plurality of angular positions of the crankshaft of the first engine, the model developed, at least partially, based upon operational data from a second engine having a rotatable crankshaft;
   a sensor operable to determine values representative of the instantaneous crankshaft speed of the first engine, at a plurality of angular positions of the crankshaft of the first engine; and
   a modifier operable to modify at least some of the representative values to, at least partially, calibrate out differences between the first and second engines that may cause variations in instantaneous crankshaft speed, the modified values being input to the model.

10. The system of claim 9, wherein the operational parameter is at least one of: engine torque, power loss, and percent cylinder-power.

11. The system of claim 9, wherein the model was developed using at least one of: a pattern matching algorithm and a neural network.

12. The system of claim 9, wherein the modifier multiplies each representative value to be modified by a correction factor.

13. The system of claim 12, wherein the correction factor is based upon historical values of instantaneous crankshaft speed of the first engine, and upon historical values of instantaneous crankshaft speed of the second engine.

14. The system of claim 13, wherein the correction factor is approximately equal to a historical value of instantaneous crankshaft speed at one position of the crankshaft of the second engine divided by a historical value of instantaneous crankshaft speed at a corresponding position of the crankshaft of the first engine measured under similar operating conditions.

15. The system of claim 14, wherein the similar operating conditions include at least one of: similar average cycle speed and similar engine load.

16. The system of claim 9, wherein the first and second engines are one of: the same engine, engines of the same type, engines of the same model, and engines manufactured on the same production line.

17. A method for estimating an operational parameter of a first engine using a model developed, at least partially, based upon operational data from a second engine, the first and second engines each comprising a rotatable crankshaft, the method comprising:

receiving a model for estimating the operational parameter of the first engine as a function of instantaneous crankshaft speed at a plurality of angular positions of the crankshaft of the first engine;

determining values representative of the instantaneous crankshaft speed of the first engine, at a plurality of angular positions of the crankshaft of the first engine;

modifying at least some of the representative values to, at least partially, calibrate out differences between the first and second engines that may cause variations in instantaneous crankshaft speed; and inputting the modified values to the model.

18. The method of claim 17, wherein the operational parameter is at least one of: engine torque, power loss, and percent cylinder-power.

19. The method of claim 17, wherein receiving a model includes receiving a model that was developed using at least one of: a pattern matching algorithm and a neural network.

20. The method of claim 17, wherein modifying at least some of the representative values includes multiplying each representative value to be modified by a correction factor.

21. The method of claim 20, wherein the correction factor is based upon historical values of instantaneous crankshaft speed of the first engine, and upon historical values of instantaneous crankshaft speed of the second engine.

22. The method of claim 21, wherein the correction factor is approximately equal to a historical value of instantaneous crankshaft speed at one position of the crankshaft of the second engine divided by a historical value of instantaneous crankshaft speed at a corresponding position of the crankshaft of the first engine measured under similar operating conditions.

23. The method of claim 22, wherein the similar operating conditions include at least one of: similar average cycle speed and similar engine load.

24. The method of claim 17, wherein the first and second engines are one of: the same engine, engines of the same type, engines of the same model, and engines manufactured on the same production line.

* * * * *